(12) United States Patent
Kunimatsu

(10) Patent No.: US 6,930,974 B2
(45) Date of Patent: Aug. 16, 2005

(54) PHASE COMPENSATION METHOD AND OPTICAL STORAGE APPARATUS

(75) Inventor: Yasukiyo Kunimatsu, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 351 days.

(21) Appl. No.: 09/923,079

(22) Filed: Aug. 6, 2001

(65) Prior Publication Data

US 2002/0114237 A1 Aug. 22, 2002

(30) Foreign Application Priority Data

Feb. 21, 2001 (JP) ........................................ 2001-045385

(51) Int. Cl.$^7$ ............................................. G11B 7/005
(52) U.S. Cl. ............................... 369/112.23; 369/47.55; 369/112.01
(58) Field of Search .......................... 369/47.55, 112.23, 369/112.01

(56) References Cited

U.S. PATENT DOCUMENTS

| | | | |
|---|---|---|---|
| 5,070,494 A | * 12/1991 | Emoto et al. | 369/112.17 |
| 5,740,147 A | * 4/1998 | Kase et al. | 369/110.04 |
| 5,898,661 A | 4/1999 | Morimoto | |
| 5,949,748 A | * 9/1999 | Iwasaki et al. | 369/53.2 |
| 6,111,840 A | * 8/2000 | Hajjar | 369/112.02 |
| 6,118,748 A | 9/2000 | Morimoto | |
| 6,392,972 B1 | * 5/2002 | Yamashita et al. | 369/53.33 |
| 6,442,123 B1 | * 8/2002 | Nishimoto | 369/112.01 |

FOREIGN PATENT DOCUMENTS

| | | |
|---|---|---|
| JP | 2000-276761 | 10/2000 |
| JP | 2001-06233 | 1/2001 |
| JP | 2001-93181 | 6/2001 |

* cited by examiner

Primary Examiner—Hoa T. Nguyen
Assistant Examiner—Michael V. Battaglia
(74) Attorney, Agent, or Firm—Greer, Burns & Crain, Ltd.

(57) ABSTRACT

A phase compensation method uses a phase plate to compensate for an optical phase of a reproduced signal in a reproducing optical system which is provided with respect to the reproduced signal from an optical recording medium. The position of the phase plate is controlled within a predetermined variable range depending on a type of the optical recording medium, so that a CNR of a reproduced signal becomes a maximum or, a DC fluctuation of the reproduced signal becomes a minimum or, a crosstalk level from adjacent tracks becomes a minimum.

12 Claims, 19 Drawing Sheets

PHASE COMPENSATION METHOD AND OPTICAL STORAGE APPARATUS

BACKGROUND OF THE INVENTION

This application claims the benefit of a Japanese Patent Application No. 2001-045385 filed Feb. 21, 2001, in the Japanese Patent Office, the disclosure of which is hereby incorporated by reference.

1. Field of the Invention

The present invention generally relates to phase compensation methods and optical storage apparatuses, and more particularly to a phase compensation method for compensating an optical phase to improve a quality of a signal reproduced from an optical recording medium, and to an optical storage apparatus which employs such a phase compensation method.

As one example of an optical storage apparatus, there is an optical disk unit which writes information on and reads information from a disk by converging light emitted from a light source on the disk via a condenser lens. The disks used by such an optical disk unit include read-only CD-ROMs, DVD-ROMs, writable phase change type optical disks, magneto-optical disks and the like.

2. Description of the Related Art

In the case of a magneto-optical disk unit, information is reproduced from the magneto-optical disk by detecting a rotation direction of a polarization plane which is generated by magnetizations which are recorded in a perpendicular direction to a recording surface of the magneto-optical disk. As methods of increasing the recording density of the magneto-optical disk, there is a method which increases the recording density in a circumferential direction of the magneto-optical disk, and a method of increasing the recording density in a radial direction of the magneto-optical disk. In order to increase the recording density in the radial direction of the magneto-optical disk, a so-called land-groove recording system has been proposed in addition to a land recording system which records the information only on lands of the recording surface of the magneto-optical disk. The land-groove recording system records the information on both the lands and grooves of the recording surface of the magneto-optical disk. The groove is formed between two adjacent lands of the recording surface. When the land-groove recording system is employed, it is possible to reduce the apparent track pitch.

When employing the land recording system, an optimum value of an optical phase of a reproducing optical system of the magneto-optical disk unit is close to 0 degree, and a phase plate for phase compensation is provided to adjust phases of optical parts and a phase of the optical system as a whole. On the other hand, when employing the land-groove recording system, a depth of the groove with respect to the land is made greater than a predetermined value, so that a high-quality signal can be reproduced by suppressing undesirable effects of crosstalk from the adjacent tracks. For this reason, an optimum amount of phase compensation differs between a case where the signal is reproduced from the land and a case where the signal is reproduced from the groove. Therefore, when employing the land-groove recording system, it is necessary to switch the amount of phase compensation between the land signal reproduction and the groove signal reproduction, by switching an inclination angle of the phase plate.

However, in the case of the magneto-optical disk unit which is designed for the magneto-optical disk employing the land-groove recording system, the structure of the magneto-optical disk unit makes it impossible to reproduce the signal when the amount of the phase compensation is close to 0 degree. Consequently, there was a first problem in that this magneto-optical disk unit is unsuited for reproducing signals from a magneto-optical disk employing the land recording system.

On the other hand, even among the magneto-optical disks employing the same land-groove recording system, the optimum amount of phase compensation differs depending on the specifications such as the wavelength of the light from the light source which is used, the depth of the groove and the track pitch. For this reason, in the case of a magneto-optical disk unit which is designed for a magneto-optical disk having a predetermined specification and employing the land-groove recording system, there was a second problem in that such a magneto-optical disk unit is unsuited for reproducing signals from magneto-optical disks having different specifications.

Furthermore, in the magneto-optical disk employing either the land recording system or the land-groove recording system, the optimum amount of phase compensation may deviate even within the same track (one track turn), the same zone or among a plurality of tracks of the magneto-optical disk due to inconsistencies introduced during the production process of the magneto-optical disk and inconsistent mounting positions of parts of the magneto-optical disk unit. But when the amount of phase compensation is switched between two fixed values between the land signal reproduction and the groove signal reproduction, there was a third problem in that it is impossible to cope with the deviation in the optimum amount of phase compensation that occurs within each track.

SUMMARY OF THE INVENTION

Accordingly, it is a general object of the present invention to provide a novel and useful phase compensation method and optical storage apparatus, in which the problems described above are eliminated.

Another and more specific object of the present invention is to provide a phase compensation method and optical storage apparatus, which carries out an appropriate phase compensation to enable signal reproduction from both an optical recording medium employing the land recording system and an optical recording medium employing the land-groove recording system or, which carries out an appropriate phase compensation to enable signal reproduction from optical recording media having different specifications or, which carries out an appropriate phase compensation within each track of an optical recording medium. According to the phase compensation method and optical storage apparatus of the present invention, it is possible to eliminate at least one of the first, second and third problems described above.

Still another object of the present invention is to provide a phase compensation method which uses a phase plate to compensate for an optical phase of a reproduced signal in a reproducing optical system which is provided with respect to the reproduced signal from an optical recording medium, comprising the step of controlling a position of the phase plate within a predetermined variable range depending on a type of the optical recording medium, so that a carrier-to-noise ratio of a reproduced signal from a track which is being reproduced becomes a maximum or, a DC fluctuation of the reproduced signal becomes a minimum or, a crosstalk level from tracks adjacent to the track which is being reproduced becomes a minimum. According to the phase compensation method of the present invention, it is possible to carry out an appropriate phase compensation to enable signal reproduction from both an optical recording medium employing the land recording system and an optical recording medium employing the land-groove recording system or, carry out an appropriate phase compensation to enable signal reproduction from optical recording media having different specifications or, carry out an appropriate phase compensation within each track of an optical recording medium.

A further object of the present invention is to provide a phase compensation method which uses a phase plate to compensate for an optical phase of a reproduced signal in a reproducing optical system which is provided with respect to the reproduced signal from an optical recording medium, comprising the steps of (a) detecting a position of the phase plate where a carrier-to-noise ratio of a reproduced signal from a track which is being reproduced becomes a maximum or, a DC fluctuation of the reproduced signal becomes a minimum or, a crosstalk level from tracks adjacent to the track which is being reproduced becomes a minimum, (b) storing control data related to the position of the phase plate depending on a type of the optical recording medium, and (c) controlling the position of the phase plate within a predetermined variable range based on the control data. According to the phase compensation method of the present invention, it is possible to carry out an appropriate phase compensation to enable signal reproduction from both an optical recording medium employing the land recording system and an optical recording medium employing the land-groove recording system or, carry out an appropriate phase compensation to enable signal reproduction from optical recording media having different specifications or, carry out an appropriate phase compensation within each track of an optical recording medium.

Another object of the present invention is to provide an optical storage apparatus comprising a phase plate which compensates for an optical phase of a reproduced signal in a reproducing optical system which is provided with respect to the reproduced signal from an optical recording medium, a detector which detects a position of the phase plate, a varying unit which varies the position of the phase plate, and a control unit which controls the position of the phase plate within a predetermined variable range depending on a type of the optical recording medium, so that a carrier-to-noise ratio of a reproduced signal from a track which is being reproduced becomes a maximum or, a DC fluctuation of the reproduced signal becomes a minimum or, a crosstalk level from tracks adjacent to the track which is being reproduced becomes a minimum. According to the optical storage apparatus of the present invention, it is possible to carry out an appropriate phase compensation to enable signal reproduction from both an optical recording medium employing the land recording system and an optical recording medium employing the land-groove recording system or, carry out an appropriate phase compensation to enable signal reproduction from optical recording media having different specifications or, carry out an appropriate phase compensation within each track of an optical recording medium. Furthermore, even if the optical storage apparatus receives an external disturbance such as shock during operation and the position of the phase plate changes, it is possible to quickly return the phase plate to its original position because the inclination angle of the phase plate is controlled based on the control data and the position detection. As a result, it is possible to improve the reliability of the optical storage apparatus.

Other objects and further features of the present invention will be apparent from the following detailed description when read in conjunction with the accompanying drawings.

DESCRIPTION OF THE PREFERRED EMBODIMENTS

Figure 1:
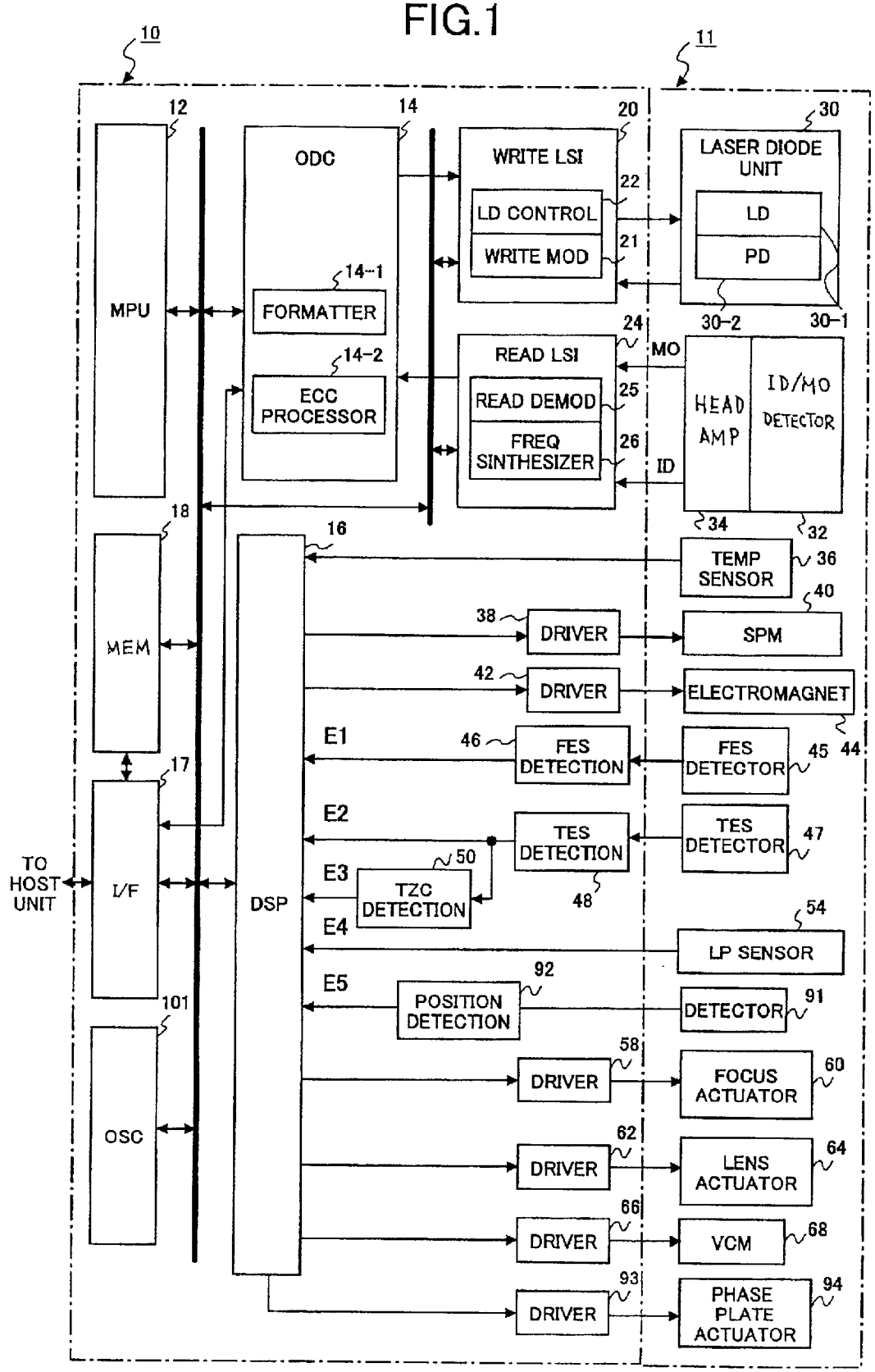
FIG. 1 is a system block diagram showing a structure of a first embodiment of an optical storage apparatus according to the present invention.

A description will be given of embodiments of a phase compensation method according to the present invention and an optical storage apparatus according to the present invention, by referring to the drawings.

First, a description will be given of a first embodiment of the optical storage apparatus according to the present invention. FIG. 1 is a system block diagram showing a structure of this first embodiment of the optical storage apparatus. In this first embodiment of the optical storage apparatus, the present invention is applied to an optical disk unit. In addition, this first embodiment of the optical storage apparatus employs a first embodiment of the phase compensation method according to the present invention.

As shown in FIG. 1, the optical disk unit generally includes a control unit 10 and an enclosure 11. The control unit 10 includes a microprocessor unit (MPU) 12 which controls the general operation of the optical disk unit, an interface 17 which exchanges commands and data between a host unit (not shown) and the optical disk unit, an optical disk controller (ODC) 14 which carries out processes required to read and write data with respect to an optical disk (not shown), a digital signal processor (DSP) 16, and a memory 18. The memory 18 is used in common by the MPU 12, the ODC 14 and the interface 17, and includes a dynamic random access memory (DRAM), a non-volatile memory for storing control programs and information such as flag information, for example. A crystal oscillator 101 is coupled to the MPU 12.

The ODC 14 includes a formatter 14-1 and an error correction code (ECC) processor 14-2. At the time of a write access, the formatter 14-1 divides NRZ write data into sector units of the optical disk 3 and generates a recording format, and the ECC processor 14-2 generates and adds an ECC with respect to sector write data units and also generates and adds if necessary a cyclic redundancy check (CRC) code. Further, the ECC processor 14-2 converts the sector data with the encoded ECC into a 1–7 run length limited (RLL) code, for example.

At the time of a read access, a reverse conversion of the 1–7 RLL is carried out with respect to the sector data, and after carrying out the CRC, the error detection and error correction using the ECC are carried out in the ECC processor 14-2. Further, the NRZ data in sector units are connected in the formatter 14-2 so as to transfer a NRZ read data stream to the host unit.

A write large scale integrated (LSI) circuit 20 is provided with respect to the ODC 14. This write LSI 20 includes a write modulator 21 and a laser diode control circuit 22. A control output of the laser diode control circuit 22 is supplied to a laser diode unit 30 which is provided in an optical unit of the enclosure 11. The laser diode unit 30 integrally includes a laser diode 30-1 and a monitoring detector 30-2. The write modulator 21 converts the write data into the data format of the pit position modulation (PPM) recording (or mark recording) or, a pulse width modulation (PWM) recording (or edge recording).

In this embodiment, the data recording and reproduction is carried out with respect to the optical disk, such as a rewritable magneto-optical (MO) disk accommodated within a MO cartridge, by the laser diode unit 30. This embodiment employs the PWM recording which records the data in correspondence wit the existence and non-existence of marks on the optical disk. The optical disk employs the 1.3 GB recording format using the magnetic super resolution (MSR), and employs the zone constant angular velocity (ZCAV). When the optical disk is loaded into the optical disk unit, intervals of identification (ID) parts which are provided at a plurality of positions in each track turn of the optical disk are recognized, in a state where a laser beam emitted from the laser diode 30-1 is in an on-track state with respect to a predetermined track. The type (recording system, storage capacity and the like) of the optical disk can be recognized from the recognized intervals, by a media type recognizing function of the MPU 12. The recognized type of the optical disk is notified to the ODC 14. The media type recognizing function of the MPU 12 may also recognize the type of the optical disk by reading a control zone of the optical disk.

A read LSI circuit 24 is provided as a read system with respect to the ODC 14. A read demodulator 25 and a frequency synthesizer 26 are provided in the read LSI circuit 24. An ID/MO detector 32 of the enclosure 11 detects the laser beam emitted from the laser diode 30-1 and returned via the optical disk, and a detection signal from this ID/MO detector 32 is input as an ID signal and a MO signal to the read LSI circuit 24 via a head amplifier 34.

The read demodulator 25 of the read LSI circuit 24 includes the functions of circuits such as an automatic gain control (AGC) circuit, a filter and a sector mark detection circuit. Hence, the read demodulator 25 generates a read clock and a read data from the input ID signal and MO signal, and demodulates the PPM data back into the original NRZ data. In addition, since the ZCAV is employed, the MPU 12 controls a setting of a frequency dividing ratio with respect to the frequency synthesizer 26 of the read LSI circuit 24 in order to generate a clock frequency in correspondence with the zone.

The frequency synthesizer 26 is made of a phase locked loop (PLL) circuit having a programmable frequency divider, and generates as a read clock a reference clock having a predetermined specific frequency depending on the zone position on the optical disk.

The write LSI circuit 20 and the read LSI circuit 24 may of course be realized by a single LSI circuit which includes all of the functions of the write LSI circuit 20 and the read LSI circuit 24.

The read data demodulated in the read LSI circuit 24 is supplied to the read system of the ODC 14, and after carrying out the reverse conversion of the 1–7 RLL, the CRC and the ECC processes are carried out by the encoding function of the ECC processor 14-2 so as to restore the original NRZ data. Next, the formatter 14-1 connects and converts the NRZ sector data into the NRZ read data stream, and this NRZ read data stream is transferred to the host unit via the memory 18 and the interface 17.

A detection signal from a temperature sensor 36 provided in the enclosure 11 is supplied with respect to the MPU 12 via the DSP 16. Based on an environmental temperature within the optical disk unit detected by the temperature sensor 36, the MPU 12 controls the light emission powers for the read, write and erase in the laser diode control circuit 22 to optimum values.

The MPU 12 controls a spindle motor 40 provided in the enclosure 11 via the DSP 16 and a driver 38. In this embodiment, since the ZCAV is employed as the recording format of the optical disk, the spindle motor 40 is rotated at a constant speed of 3637 rpm, for example.

In addition, the MPU 12 controls an electromagnet 44 provided in the enclosure 11 via the DSP 16 and a driver 42. The electromagnet 44 is arranged on a side opposite to the side of the optical disk on which the laser beam is irradiated within the optical disk unit which is loaded with this optical disk. This electromagnet 44 supplies an external magnetic field on the optical disk at the time of the recording and erasure. In the case of the optical disk having the 1.3 GB recording format and using the MSR, the external magnetic field is also supplied to the optical disk at the time of the MSR reproduction.

The DSP 16 is provided with a servo function for positioning the laser beam from the laser diode 30-1 with respect to the optical disk, and functions as a seek controller and an on-track controller which enable the laser beam to seek a target track and to be positioned on the target track. The seek control and the on-track control may be carried out simultaneously in parallel with the write access or the read access of the MPU 12 with respect to a host command.

In order to realize the servo function of the DSP 16, a focus error signal (FES) detector 45 is provided in the optical unit of the enclosure 11 so as to detect the laser beam emitted from the laser diode 30-1 and returned via the optical disk. A FES detection circuit 46 generates a FES E1 from a detection signal received from the FES detector 45, and inputs this FES E1 to the DSP 16.

A tracking error signal (TES) detector 47 is also provided in the optical unit of the enclosure 11 so as to detect the laser beam emitted from the laser diode 30-1 and returned via the optical disk. A TES detection circuit 48 generates a TES E2 from a detection signal received from the TES detector 47, and inputs this TES E2 to the DSP 16. The TES E2 is also input to a track zero crossing (TZC) detection circuit 50, and this TZC detection circuit 50 generates a TZC signal E3 which is input to the DSP 16.

A lens position sensor 54 is provided in the enclosure 11. This lens position sensor 54 detects a position of an objective lens through which the laser beam is irradiated on the optical disk. A lens position detection signal (LPOS) E4 from the lens position sensor 54 is input to the DSP 16. The DSP 16 controls and drives a focus actuator 60, a lens actuator 64 and a voice coil motor (VCM) 68 via corresponding drivers 58, 62 and 66, so as to control the position of a beam spot formed by the laser beam on the optical disk.

A phase plate which will be described later is provided in the reproducing optical system of the optical unit within the enclosure 11. A phase plate position detector 91 detects a position of the phase plate and supplies a detection signal to a position detection circuit 92. The position detection circuit 92 generates a position detection signal E5 which indicates the position of the phase plate, and inputs this position detection signal E5 to the DSP 16. Accordingly, the MPU 12 can detect the position of the phase plate via the DSP 16. The MPU 12 controls and drives a phase plate actuator 94 which is provided in the enclosure 11, via the DSP 16 and a driver 93. The phase plate is controlled to a desired position by the phase plate actuator 92.

Figure 2:
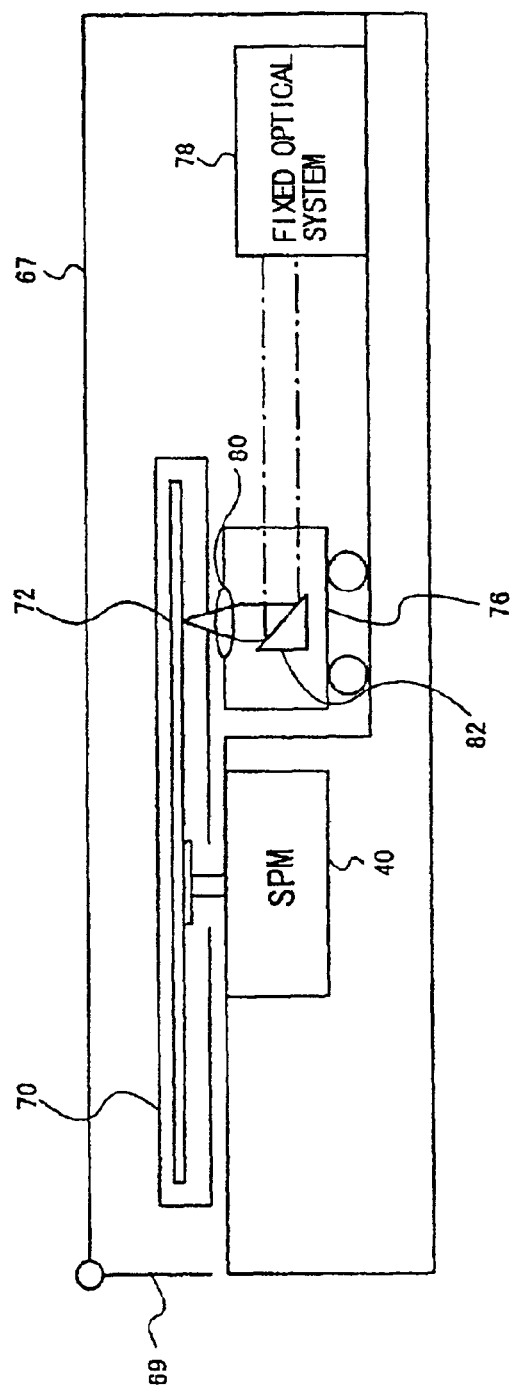
FIG. 2 is a cross sectional view showing a general structure of an enclosure.

FIG. 2 is a cross sectional view showing a general structure of the enclosure 11. As shown in FIG. 2, the spindle motor 40 is provided within a housing 67. By inserting a MO cartridge 70 into the housing 67 from the side of an inlet door 69, an optical disk (MO disk) 72 accommodated within the MO cartridge 70 engages a hub on a rotary shaft of the spindle motor 40, thereby loading the optical disk 72 with respect to the optical disk unit.

A carriage 76 is provided below the optical disk 72 within the loaded MO cartridge 70. This carriage 76 is freely movable in a direction which traverses tracks on the optical disk 72 when driven by the VCM 64. An objective lens 80 is mounted on the carriage 76. The laser beam emitted from the laser diode 30-1 which is provided within a fixed optical system 78 is reflected by a mirror 82, and is irradiated on the recording surface of the optical disk 72 via the objective lens 80, thereby forming a beam spot on the recording surface. The movement of the objective lens 80 along an optical axis is controlled by the focus actuator 60 of the enclosure 11 shown in FIG. 1. In addition, the objective lens 80 is movable in a radial direction which traverses the tracks on the optical disk 3 by the lens actuator 64, within a range of several tens of tracks. The position of the objective lens 80 mounted on the carriage 76 is detected by the lens position sensor 54 shown in FIG. 1. The lens position sensor 54 outputs the lens position detection signal E4 which takes a value zero at a neutral position where the optical axis of the objective lens 80 is perpendicular to the recording surface of the optical disk 72, and has a magnitude and a polarity depending on the amount the optical axis of the objective lens 80 moves towards the inner or outer peripheral side of the optical disk 72.

Figure 3A:
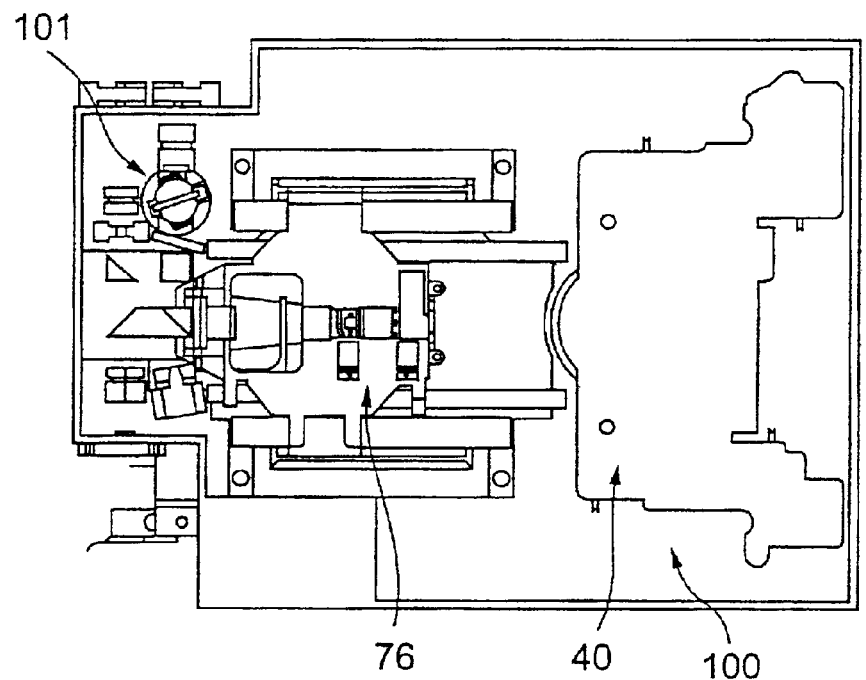
FIGS. 3A and 3B respectively are diagrams showing a structure of an important part within the enclosure.
Figure 3B:
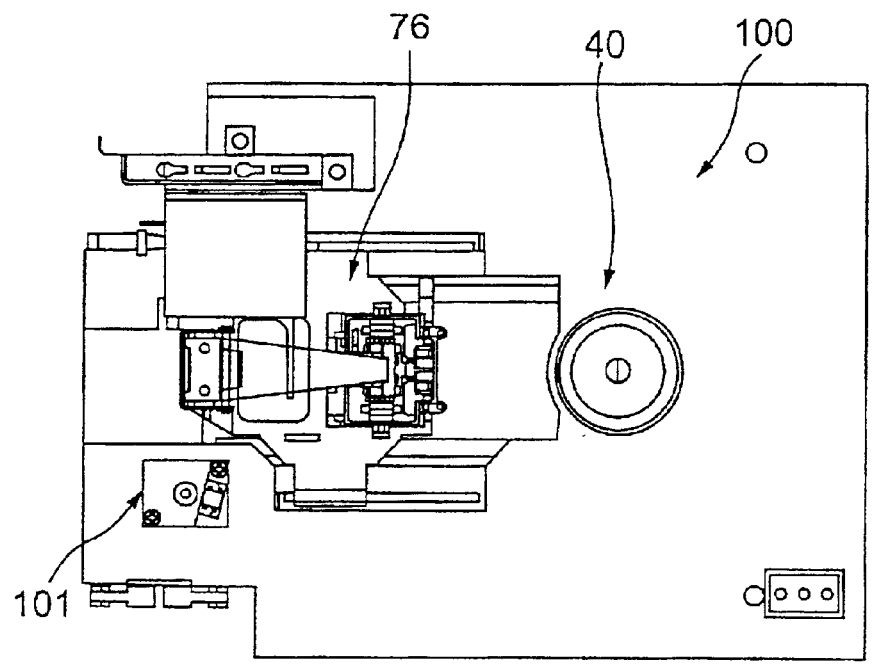

FIGS. 3A and 3B respectively are diagrams showing a structure of an important part within the enclosure 11. FIG. 3A is a plan view, and FIG. 3B is a bottom view. As shown in FIGS. 3A and 3B, the spindle motor 40, the carriage 76 and the like are provided on a base 100 of the enclosure 11 together with a phase compensation mechanism 101.

Figure 4:
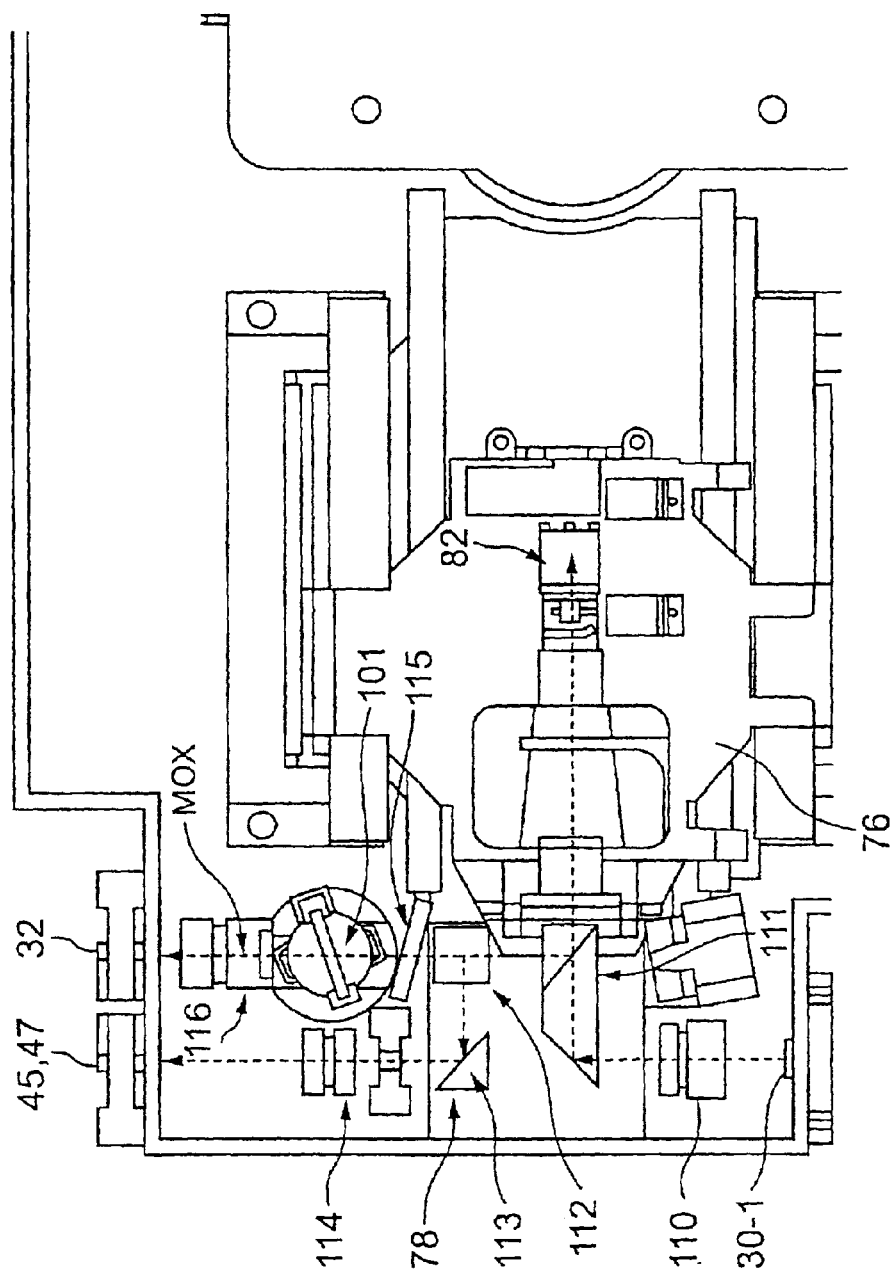
FIG. 4 is a plan view showing a part of the important part shown in FIG. 3 on an enlarged scale.
Figure 5:
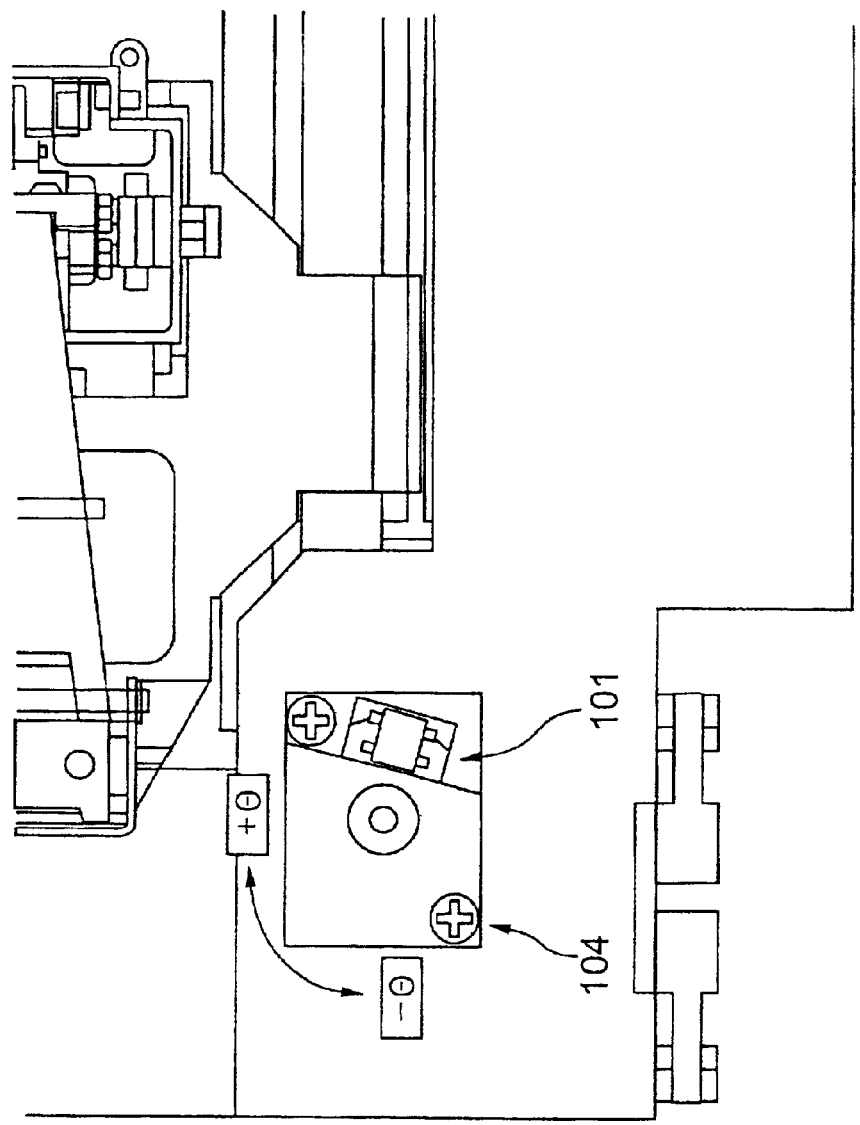
FIG. 5 is a bottom view showing a part of the important part shown in FIG. 3 on an enlarged scale.

FIG. 4 is a plan view showing a part of the important part shown in FIG. 3A on an enlarged scale. FIG. 5 is a bottom view showing a part of the important part shown in FIG. 3B on an enlarged scale.

The fixed optical system 78 includes a collimator lens 110, beam splitters 111, 112 and 113, a lens system 114, a second phase plate 115, the phase compensation mechanism 101, and a lens system 116. The laser beam emitted from the laser diode 30-1 is irradiated on the optical disk 72 (not shown) via the collimator lens 110, the beam splitter 111 and the mirror 82. The reflected beam from the optical disk 72, which is obtained via the beam splitter 111, is supplied to the lens system 114 via the beam splitters 112 and 113 on one hand, and is supplied to the second phase plate 115 via the beam splitter 112 on the other. The beam which passes through the lens system 114 which includes a condenser lens, is detected by the FES detector 45 and the TES detector 47. The beam obtained from the second phase plate 115 is detected by the ID/MO detector 32 via the phase compensation mechanism 101 and the lens system 116. The lens system 116 includes a Wollaston prism and a condenser lens. In FIG. 4, MOX indicates an optical axis of the returning MO signal.

The reproducing optical system within the enclosure 11 generally includes the beam splitters 112 and 113, the lens system 114, the second phase plate 115, the phase compensation mechanism 101 and the lens system 116.

The second phase plate 115 is provided supplementary in order to cope with a situation where the desired amount of phase compensation cannot be obtained solely by the phase compensation mechanism 101. Hence, the second phase plate 115 may be omitted. In addition, the position of the second phase plate 115 is not limited to that shown in FIG. 4, and may be arranged between the beam splitter 111 and the mirror 82, for example. When providing the second phase plate 115, the phase compensation mechanism 101 is first positioned and fixed on the base 100, and the position of the second phase plate 115 is then adjusted so that the reproduced signal from the optical disk 72 becomes satisfactory or preferably optimum, before fixing the second phase plate 115.

The phase compensation mechanism 101 is mounted on the base 100 by fixing screws 104 as shown in FIG. 5, so that an inclination angle of a phase plate within the phase compensation mechanism 101, which will be described later, is adjustable in a range of $-\theta$ to $+\theta$.

Figure 6:
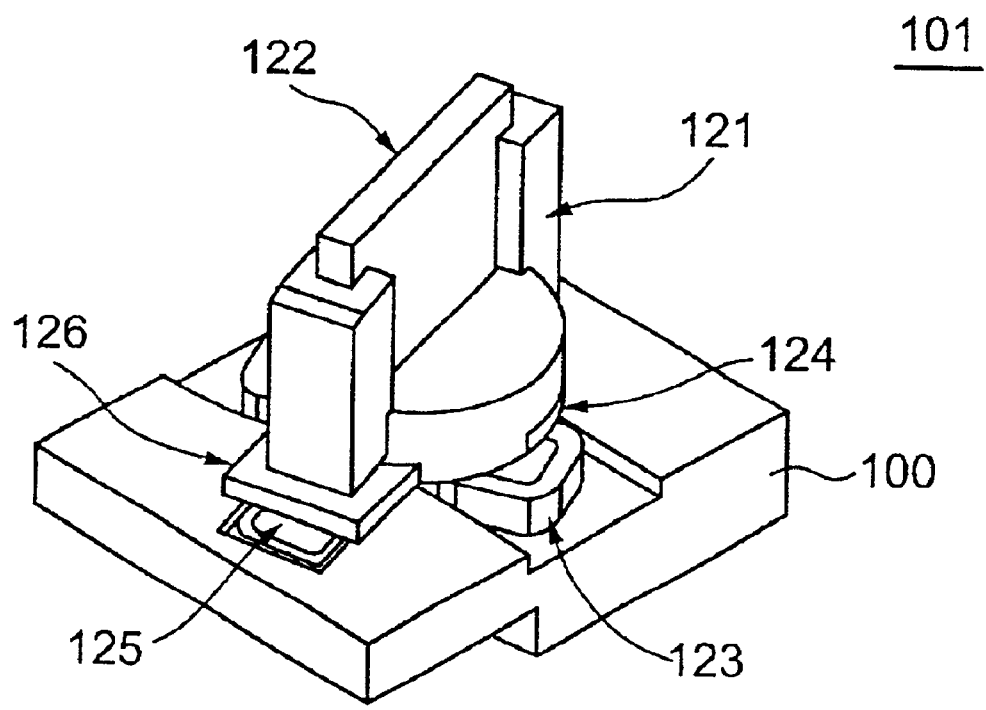
FIG. 6 is a perspective view showing a phase compensation mechanism.

Next, a description will be given of the phase compensation mechanism 101, by referring to FIGS. 6 and 7. FIG. 6 is a perspective view showing the phase compensation mechanism 101, and FIG. 7 is a plan view showing the phase compensation mechanism 101.

As shown in FIG. 6, the phase compensation mechanism 101 generally includes a holder 121 which is rotatably provided on the base 100, and a (first) phase plate 122 which is held by the holder 121. A magnet 124 is provided on a bottom part of the holder 121 in a vicinity of a rotary shaft of the holder 121. This magnet 124 cooperates with a coil 123 which is provided on the base 100. The coil 123 and the magnet 124 form a so-called voice coil motor (VCM), and corresponds to the phase plate actuator 94 shown in FIG. 1. In addition, a reflection mirror 126 is provided on a bottom surface of a side part of the holder 121. This reflection mirror 126 cooperates with a detector 125 provided on the base 100. The detector 125 corresponds to the phase plate position detector 91 shown in FIG. 1.

The holder 121 of the phase compensation mechanism 101 is driven by the coil 123 and the magnet 124, and the inclination angle of the phase plate 122 is adjustable in the range of −θ to +θ. The inclination angle of the phase plate 122 is detected by the detector 125 and the reflection mirror 126. More particularly, the detector 125 is made up of a light emitting part and a light receiving part, and light emitted from the light emitting part is reflected by the reflection mirror 126 and detected by the light receiving part. As will be described later, the reflection mirror 126 includes a bright portion which is formed by evaporation or the like of aluminum and has a high reflectivity, and a dark portion which is formed by evaporation or the like of carbon and has a low reflectivity.

Figure 7:
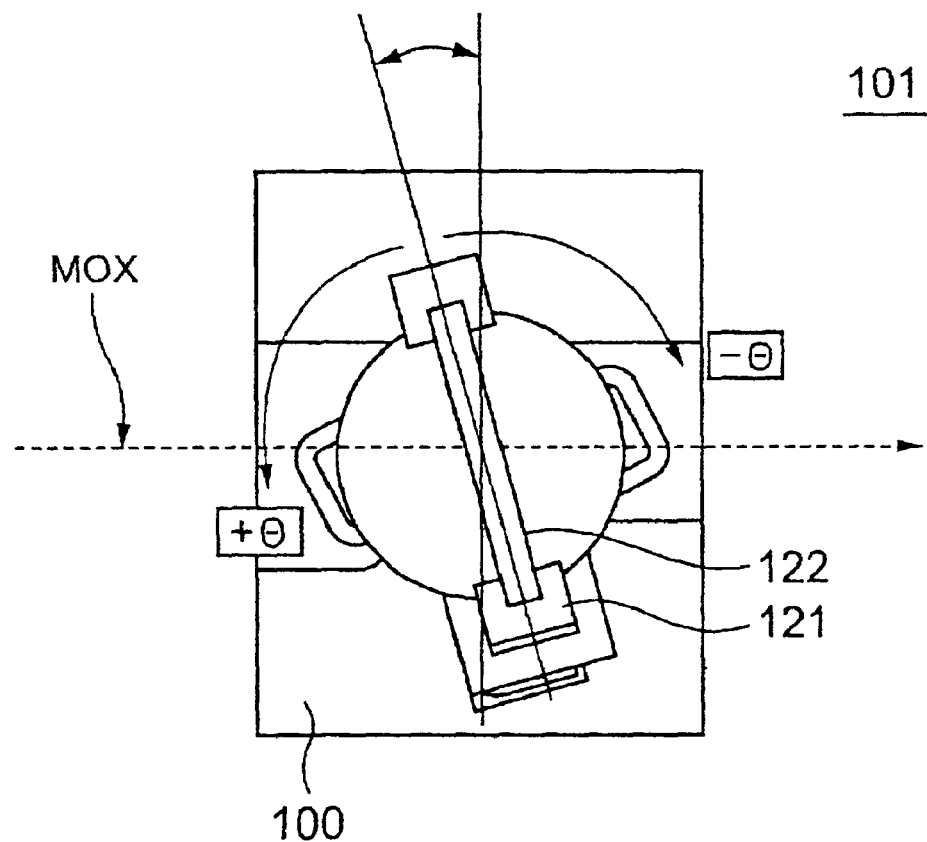
FIG. 7 is a plan view showing the phase compensation mechanism.

FIG. 7 shows a state where the phase plate 122 is positioned approximately at a center of the adjustable range and is inclined with respect to the optical axis MOX of the returning MO signal by an angle which gives an amount of phase compensation equal to 0 degree. The angle of the phase plate 122 with respect to the optical axis MOX of the returning MO signal corresponds to the inclination angle of the phase plate 122.

Figure 8:
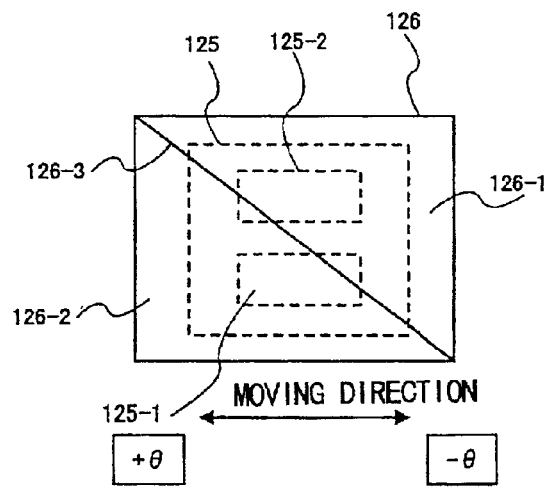
FIG. 8 is a diagram for explaining an embodiment of a reflection mirror.

FIG. 8 is a diagram for explaining an embodiment of the reflection mirror 126, and shows a state where the detector 125 is seen through the reflection mirror 126. In FIG. 8, the detector 125 is made up of a light emitting part 125-1 and a light receiving part 125-2. The reflection mirror 126 is made up of a bright portion 126-1 and a dark portion 126-2 which are partitioned by an oblique brightness boundary line 126-3. In other words, the brightness boundary line 126-3 is inclined by a predetermined inclination angle with respect to the direction in which the light emitting part 125-1 and the light receiving part 125-2 of the detector 125 are arranged, that is, with respect to a vertical direction in FIG. 8. In FIG. 8, an arrow indicates a relative moving direction of the detector 125 and the reflection mirror 126.

Figure 9:
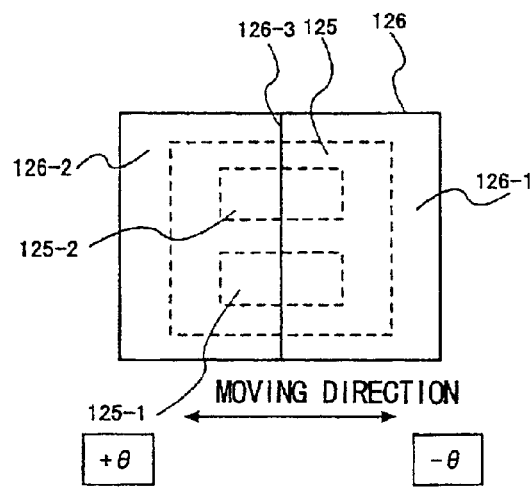
FIG. 9 is a diagram for explaining another embodiment of the reflection mirror.

FIG. 9 is a diagram for explaining another embodiment of the reflection mirror 126, and shows a state where the detector 125 is seen through the reflection mirror 126. In FIG. 9, the detector 125 is made up of a light emitting part 125-1 and a light receiving part 125-2. The reflection mirror 126 is made up of a bright portion 126-1 and a dark portion 126-2 which are partitioned by a vertical brightness boundary line 126-3. In FIG. 9, an arrow indicates a relative moving direction of the detector 125 and the reflection mirror 126.

Figure 10:
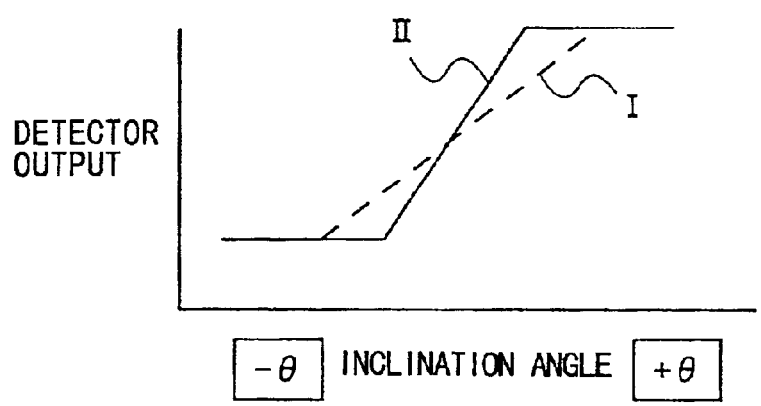
FIG. 10 is a diagram showing a relationship of an inclination angle of a phase plate and a detector output.

FIG. 10 is a diagram showing a relationship of the inclination angle of the phase plate 122 and an output of the detector 125. In FIG. 10, the ordinate indicates the output (detector output) of the detector 125 in arbitrary units, and the abscissa indicates the inclination angle of the phase plate 122 in arbitrary units. When an oblique edge detection is carried out using the reflection mirror 126 shown in FIG. 8, the relative positions of the detector 125 and the reflection mirror 126 change as the phase plate 122 turns, and the detector output changes as indicated by a dotted line I in FIG. 10. In addition, when a normal edge detection is carried out using the reflection mirror 126 shown in FIG. 9, the relative positions of the detector 125 and the reflection mirror 126 change as the phase plate 122 turns, and the detector output changes as indicated by a solid line II in FIG. 10. By controlling the coil 123 based on such a detector output, the phase 122 is locked to a desired inclination angle with respect to the optical axis MOX of the returning MO signal. When mounting the phase compensation mechanism 101 on the base by the fixing screws 104, the inclination angle of the phase plate 122 is locked in such a manner.

As may be seen from FIG. 10, the detector output becomes more gradual when the oblique edge detection is used as compared to the case where the normal edge detection is used. Accordingly, even when offsets of circuits such as the position detection circuit 92 shown in FIG. 1 are accumulated, it is possible to lock the phase plate 122 at an inclination angle closer to the desired inclination angle by use of the reflection mirror 126 shown in FIG. 8 than by use of the reflection mirror 126 shown in FIG. 9, and a more accurate amount of phase compensation can be given by the reflection mirror 126 shown in FIG. 8.

Figure 11:
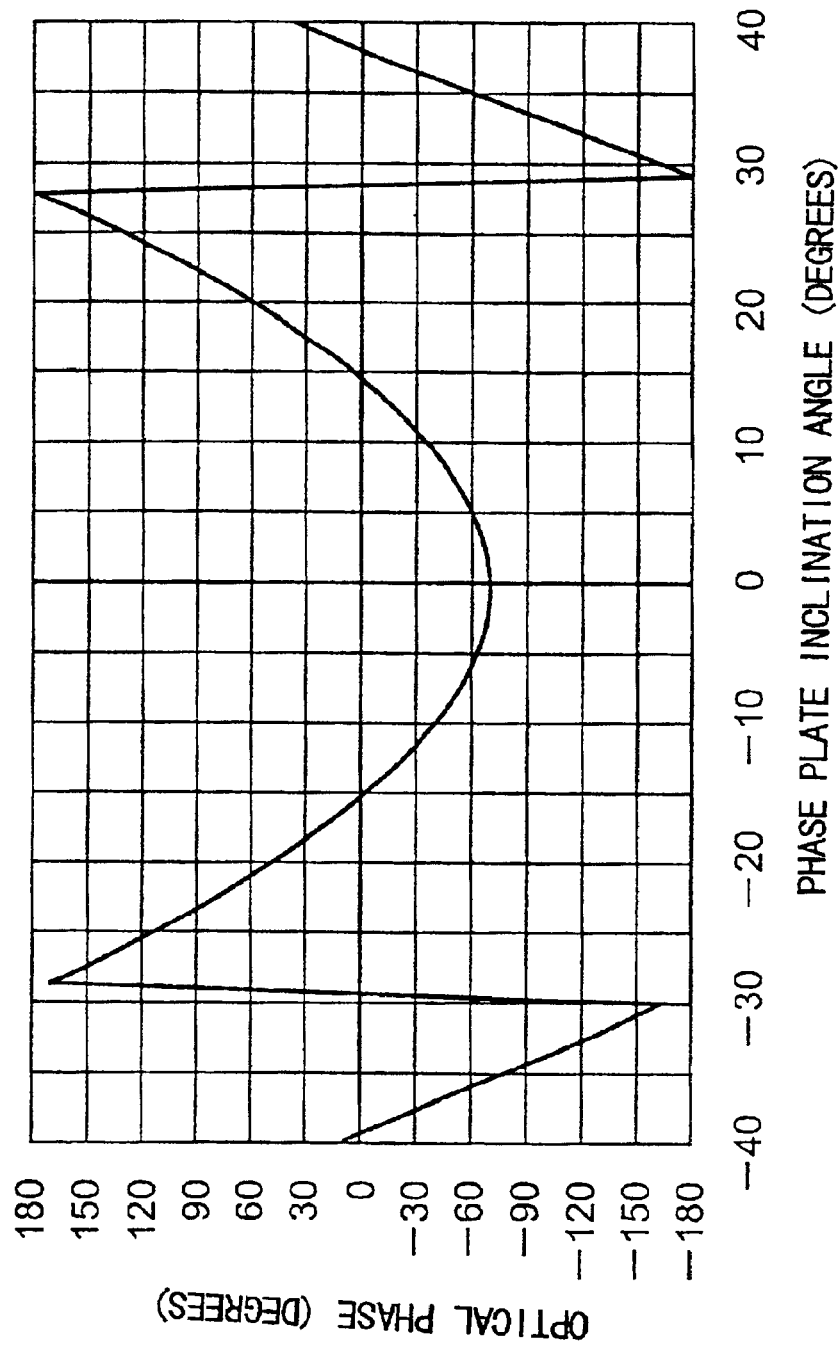
FIG. 11 is a diagram showing a relationship of an optical phase and the inclination angle of the phase plate.

FIG. 11 is a diagram showing a relationship of an optical phase and the inclination angle of the phase plate 122. In FIG. 11, the ordinate indicates the optical phase (degrees), and the abscissa indicates the inclination angle (degrees) of the phase plate 122. For example, when using an optical phase in a range of approximately −30 degrees to approximately +30 degrees, it may be seen from FIG. 11 that the phase plate 122 should be used with an inclination angle in a range of approximately +11.5 degrees to approximately +18.5 degrees or in a range of approximately −11.5 degrees to approximately −18.5 degrees.

Figure 12:
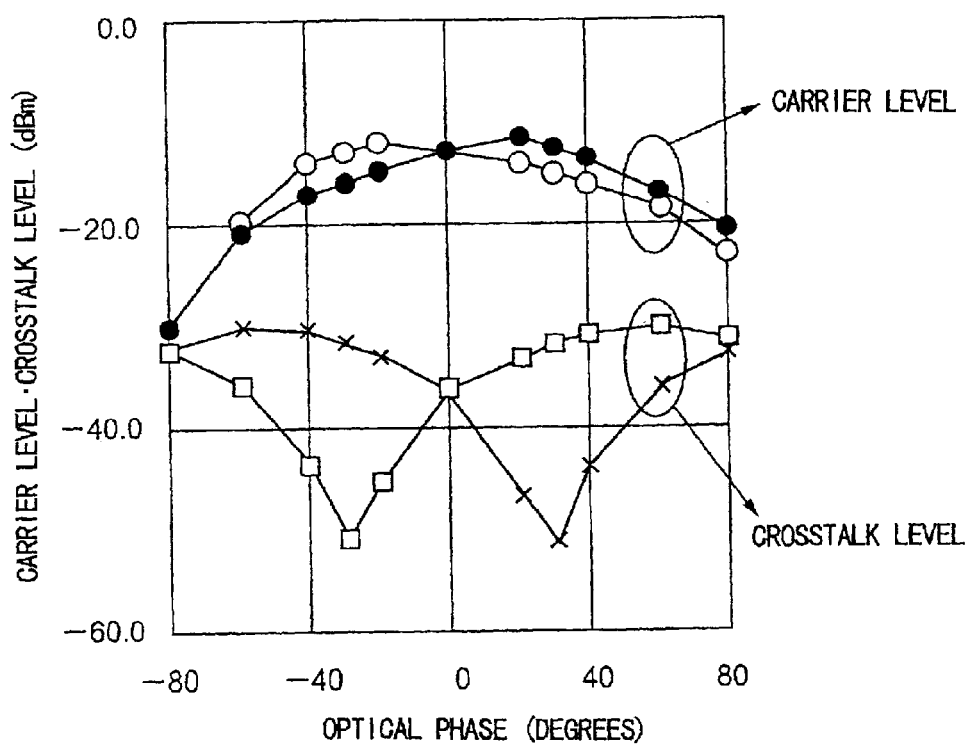
FIG. 12 is a diagram showing a relationship of a carrier level and a crosstalk level with respect to the optical phase, for a reproduced signal from an optical disk employing a land-groove recording system.

FIG. 12 is a diagram showing a relationship of a carrier level and a crosstalk level with respect to the optical phase, for a reproduced signal from the optical disk 72 employing the land-groove recording system. In FIG. 12, the ordinate indicates the carrier level (dBm) and the crosstalk level (dBm), and the abscissa indicates the optical phase (degrees). In addition, a symbol ○ indicates the carrier level of the reproduced signal from the groove of the optical disk 72, a symbol ● indicates the carrier level of the reproduced signal from the land of the optical disk 72, a symbol x indicates the crosstalk level from the adjacent grooves of the optical disk 72, and a symbol □ indicates the crosstalk level from the adjacent lands of the optical disk 72. By carrying out the phase compensation using the phase plate 122, the carrier level increases and the crosstalk level from the adjacent tracks decreases. For example, when using an optical phase in a range of approximately −30 degrees to approximately +30 degrees, it may also be seen from FIG. 12 that the phase plate 122 should be used with an inclination angle in a range of approximately +11.5 degrees to approximately +18.5 degrees or in a range of approximately −11.5 degrees to approximately −18.5 degrees.

Therefore, according to this embodiment, it is possible to control the inclination angle of the phase plate 122 to an arbitrary inclination angle to give an optimum amount of phase compensation with respect to the reproduced signal, by detecting the inclination angle of the phase plate 122 and controlling the inclination angle of the phase plate based on the detected result. The inclination angle of the phase plate 122 may be controlled and switched between an inclination angle with respect to the reproduced signal from the land of the optical disk 72 and an inclination angle with respect to the reproduced signal from the groove of the optical disk 72. In addition, it is possible to appropriately control the inclination angle of the phase plate 122 depending on the optimum amount of phase compensation to suit each type of optical disk used. For this reason, it is possible to give an optimum amount of phase compensation with respect to each type of optical disk, regardless of whether the optical disk used employs the land recording system or the land-groove recording system.

Figure 13:
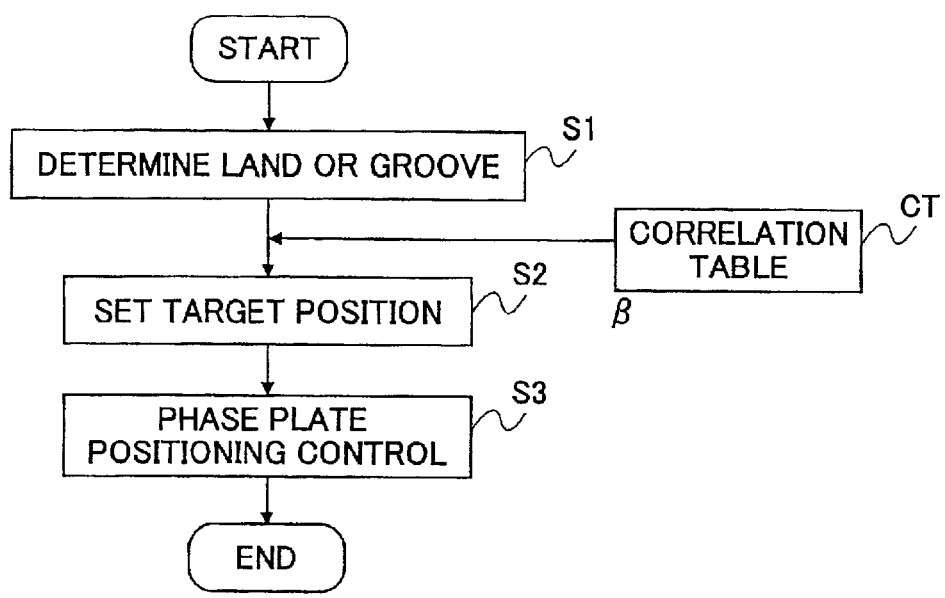
FIG. 13 is a flow chart for explaining the operation of the first embodiment of the optical storage apparatus.

FIG. 13 is a flow chart for explaining the operation of this first embodiment of the optical storage apparatus. The process shown in FIG. 13 is carried out by the MPU 12 shown in FIG. 1. First, a step S1 determines whether the reproduced signal from the optical disk 72 is a reproduced signal from the land or a reproduced signal from the groove, based on position information which is recorded on the optical disk 72. A step S2 sets a target position, that is, a target inclination angle, of the phase plate 122, depending on whether the reproduced signal is from the land or the groove of the optical disk 72. The memory 18 prestores a correlation table CT which indicates a correlation of a target optical phase with respect to each type of optical disk 72 and a corresponding target position of the phase plate 122, with respect to both the land and the groove. Accordingly, the step S2 reads the target position of the phase plate 122 from the correlation table CT depending on whether the track being reproduced is provided on the land or the groove, that is, whether a land signal reproduction or a groove signal reproduction is being carried out. A step S3 drives and controls the phase plate actuator 94 depending on the target position of the phase plate 122 set in the step S2, and the process ends.

The optical phase of the reproducing optical system as a whole within the enclosure 11 differs for each individual optical disk unit due to inconsistencies. For this reason, it is necessary to recognize a reference optical phase when mounting the phase compensation mechanism 101 in the optical disk unit. A method of recognizing the optical phase is not limited to a particular method, but for example, any one of following first through third recognition methods may be employed.

According to the first recognition method, a reference optical disk from which an optimum reproduced signal is obtained when the optical phase is 0 degree, for example, is used. In addition, an offset is added to the signal which drives and controls the phase plate actuator 94, and a position of the phase plate 122 where the optimum reproduced signal is obtained from the reference optical disk is recognized as the position where the optical phase of the reproducing optical system as a whole is 0 degree. A correlation of the detection output of the phase plate position detector 91 and the inclination angle and the amount of phase compensation of the phase plate 122 may be known by carrying out an evaluation in advance. Hence, when the inclination angle of the phase plate 122 where the optical phase can be recognized as being 0 degree is known, it is possible to give the optimum amount of phase compensation with respect to both the case of the land signal reproduction and the case of the groove signal reproduction, by changing the inclination angle of the phase plate 122 based on the known value. The optimum reproduced signal refers to a signal which is reproduced from a track and having a maximum carrier-to-noise ratio (CNR), a minimum DC deviation, and/or a minimum crosstalk level from the adjacent tracks which are adjacent to the track which is being reproduced.

Figure 14:
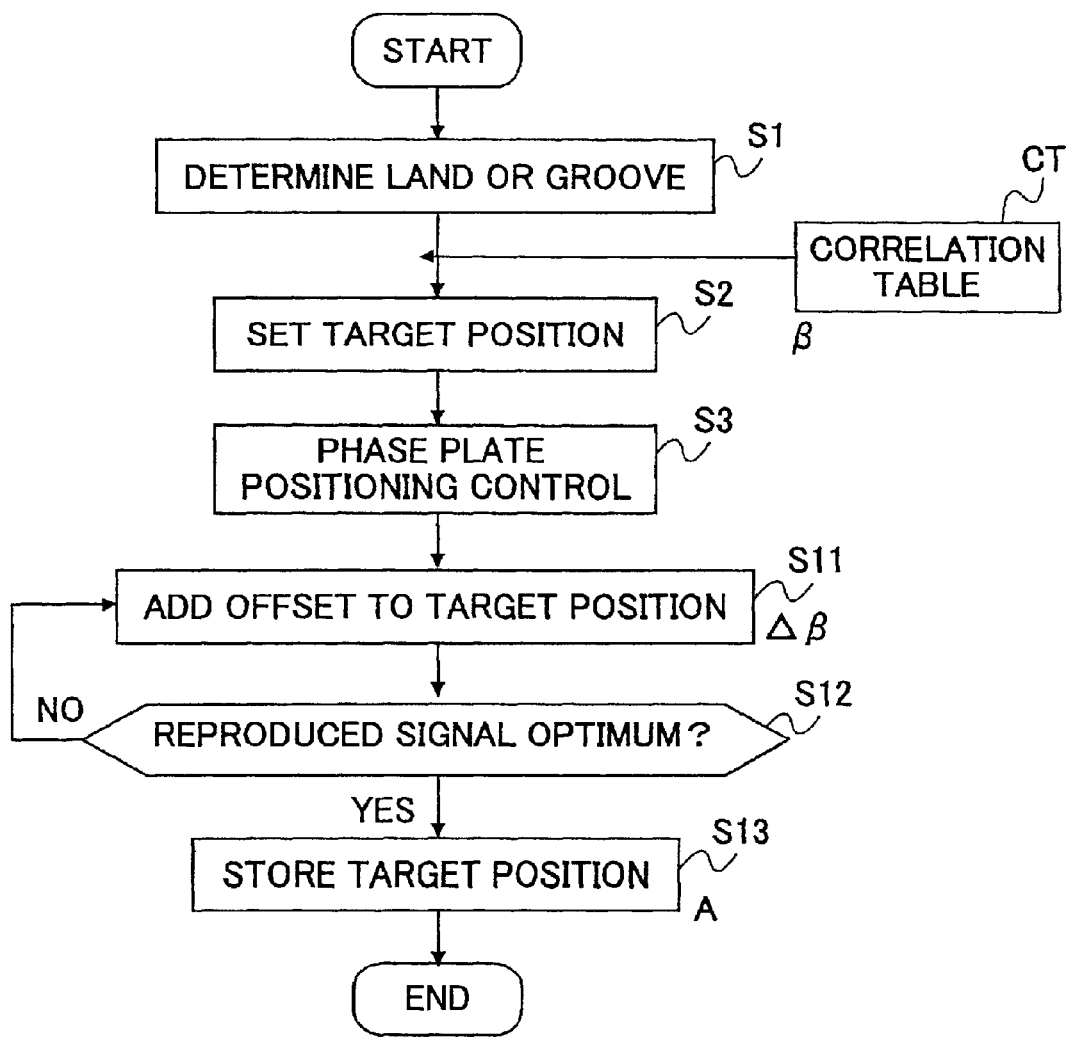
FIG. 14 is a flow chart for explaining a first recognition method.

FIG. 14 is a flow chart for explaining the first recognition method. In FIG. 14, those steps which are the same as those corresponding steps in FIG. 13 are designated by the same reference numerals, and a description thereof will be omitted.

In FIG. 14, a step S11 adds an offset to the target position of the phase plate 122, and drives and controls the phase plate actuator 94. A step S12 decides whether or not an optimum reproduced signal is obtained from the reference optical disk. If the decision result in the step S12 is NO, the process returns to the step S11, and a further offset is added to the target position of the phase plate 122. On the other hand, if the decision result in the step S12 is YES, a step S13 recognizes the position of the phase plate 122 where the optimum reproduced signal is obtained from the reference optical disk as being a position where the optical phase of the reproducing optical system as a whole is 0 degree, and stores this position of the phase plate 122 in the memory 18 as the target position. More particularly, the step S13 creates the correlation table CT within the memory 18. The process ends after the step S13.

Figure 15:
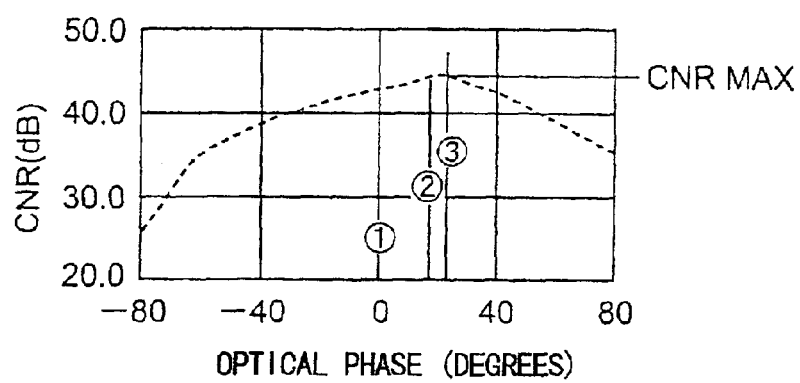
FIG. 15 is a diagram showing a relationship of a carrier-to-noise ratio and the optical phase.
Figure 16A:
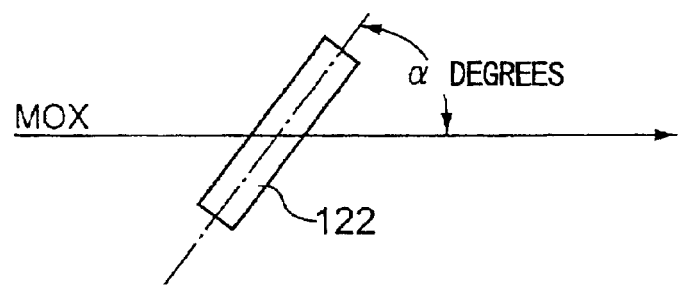
FIGS. 16A, 16B and 16C respectively are diagrams for explaining the inclination angle of the phase plate.

FIG. 15 is a diagram showing a relationship of the CNR and the optical phase for the land signal reproduction from the reference optical disk. In FIG. 15, the ordinate indicates the CNR (dB), the abscissa indicates the optical phase (degrees), and CNRMAX indicates a maximum value of the CNR. In addition, FIGS. 16A, 16B and 16C respectively are diagrams for explaining the inclination angle of the phase plate 122. FIG. 16A shows a case where the inclination angle of the phase plate 122 is $\alpha$ degrees, FIG. 16B shows a case where the inclination angle of the phase plate 122 is $\alpha+\beta$ degrees, and FIG. 16C shows a case where the inclination angle of the phase plate 122 is $\alpha+\beta+\Delta\beta$ degrees.

Figure 16B:
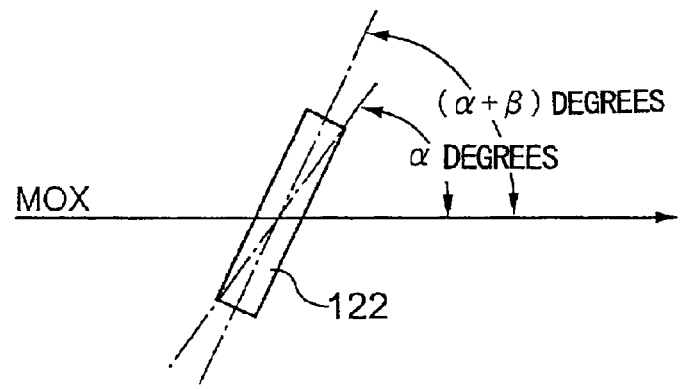
Figure 16C:
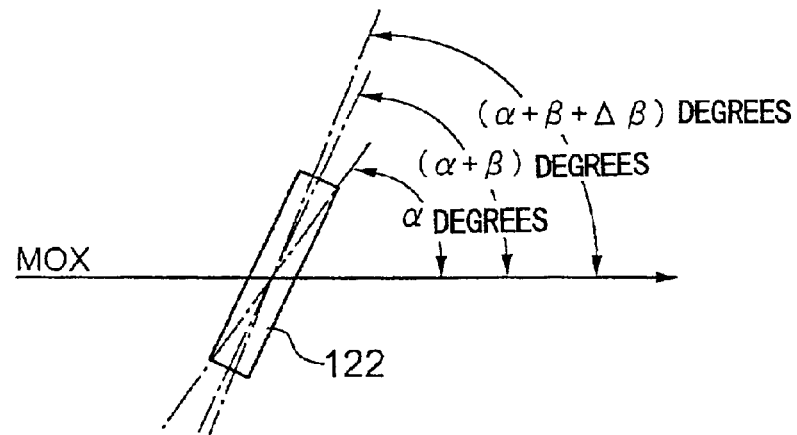

In FIG. 15, ① indicates a case where the inclination angle of the phase plate 122 is as shown in FIG. 16A, ② shows a case where the inclination angle of the phase plate 122 is as shown in FIG. 16B, and ③ shows a case where the inclination angle of the phase plate 122 is as shown in FIG. 16C. In FIG. 15, the CNR becomes the maximum value CNRMAX in the case ③, and thus, the position of the phase plate 122 where the optimum reproduced signal is obtained in the process shown in FIG. 14 is when the inclination angle of the phase plate 122 is $\alpha+\beta+\Delta\beta$ degrees as shown in FIG. 16C.

According to the second recognition method, a reference optical disk from which an optimum reproduced signal is obtained when the optical phase is 0 degree, for example, is used, and the phase plate actuator 94 is driven and controlled, so as to lock the phase plate 122 at the inclination angle where the amount of phase compensation becomes 0 degree according to design. Then, the rotary position of the entire phase compensation mechanism 101 is adjusted with respect to the optical disk unit, and the phase compensation mechanism 101 is fixed at the rotary position where the optimum reproduced signal is obtained. Thereafter, the optimum amount of phase compensation is given with respect to both the case of the land signal reproduction and the groove signal reproduction, by a procedure similar to that employed in the first recognition method described above.

According to the third recognition method, a reference optical disk from which an optimum reproduced signal is obtained when the optical phase is 0 degree, for example, is used, and the phase plate actuator 94 is driven and controlled, so as to lock the phase plate 122 within the phase compensation mechanism 101 at the inclination angle where the amount of phase compensation becomes 0 degree according to design. Then, the position of the second phase plate 115 for finely adjusting the optical phase to 0 degree is adjusted so that an optimum reproduced signal is obtained, before finally fixing the position of the second phase plate 115 in the optical disk unit.

Therefore, according to this embodiment, it is possible to carry out an appropriate phase compensation, and reproduce signals from both the optical recording medium employing the land recording system and the optical recording medium employing the land-groove recording system. In addition, it is possible to reproduce signals from optical recording media having different specifications, by carrying out an appropriate phase compensation. Hence, the first and second problems of the prior art described above can be eliminated.

Next, a description will be given of a second embodiment of the optical storage apparatus according to the present invention. The basic structure of this second embodiment of the optical storage apparatus is the same as that of the first embodiment described above, and a description and illustration thereof will be omitted. In this second embodiment of the optical storage apparatus, the present invention is applied to an optical disk unit. This second embodiment of the optical storage apparatus employs a second embodiment of the phase compensation method according to the present invention.

In this second embodiment, the inclination angle of the phase plate 122 of the phase compensation mechanism 101 is varied in synchronism with the rotation of the optical disk 72 so that a DC fluctuation of the reproduced signal (MO signal) becomes constant and minimum within one revolution of the optical disk 72, that is, within one track (or the same track turn), within one zone (or same zone), and/or within a plurality of tracks, so that it is possible to always obtain a reproduced signal within an optimum optical phase.

In addition, it is possible to always obtain a reproduced signal with an optimum optical phase, by varying the inclination angle of the phase plate 122 of the phase compensation mechanism 101 in synchronism with the rotation of the optical disk 72, so that the crosstalk level from the tracks adjacent to the track which is being reproduced is minimized.

Control data for varying the inclination angle of the phase plate 122 so that the fluctuation of the MO signal becomes constant and minimum within one revolution of the optical disk 72 (one track), within the same zone and/or within the plurality of tracks, and/or so that the crosstalk level from the adjacent tracks becomes a minimum, may be stored in the memory 18. In this case, by controlling the inclination angle of the phase plate 122 based on the control data stored in the memory 18 during the signal reproduction, it is possible to always obtain the reproduced signal with the optimum optical phase. Moreover, the inclination angle of the phase plate 122 may be controlled within one revolution of the optical disk 72 (one track), within the same zone and/or within the plurality of tracks as described above, with respect to each of the land and the groove of the optical disk 72.

Figure 17:
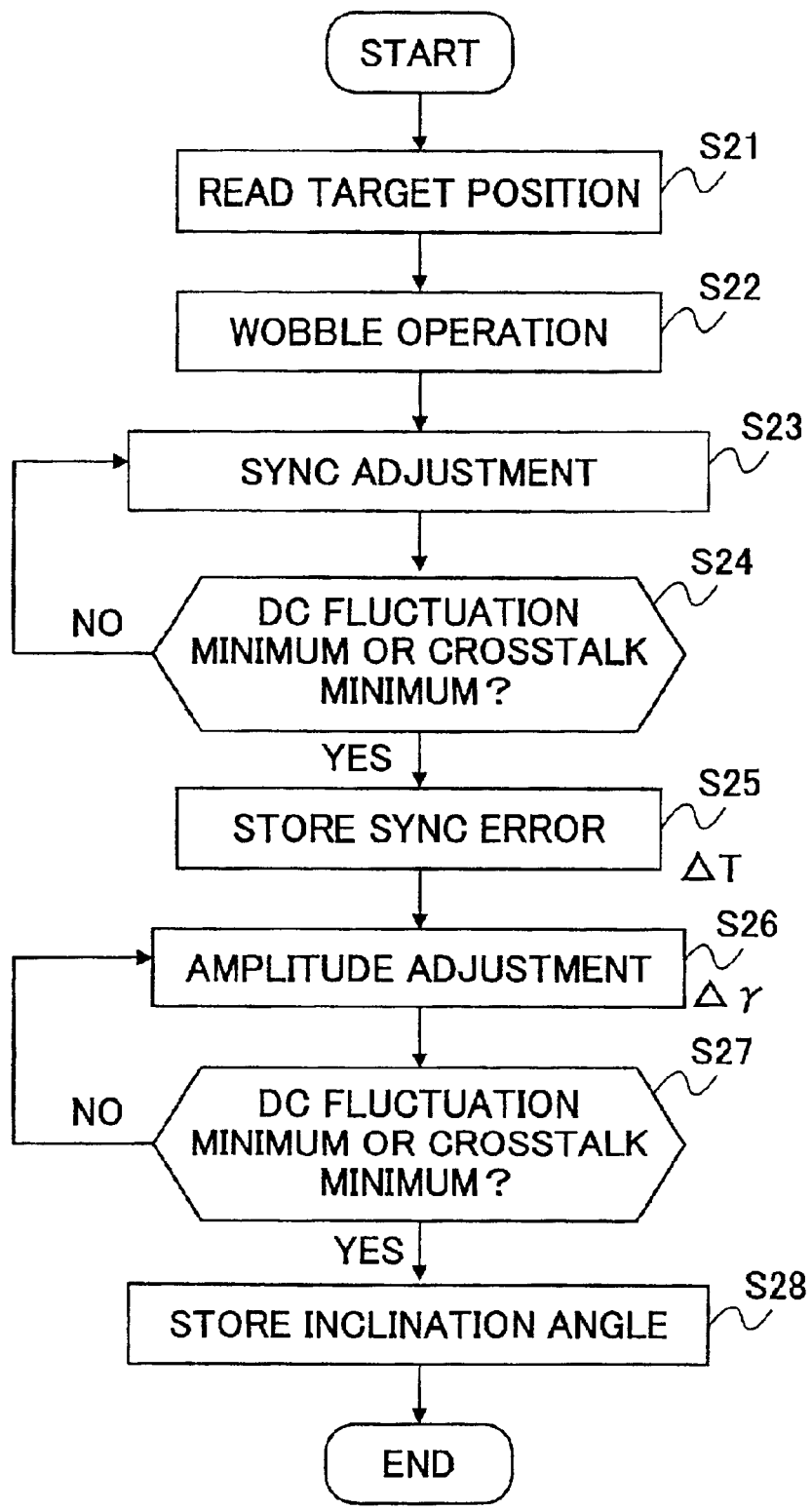
FIG. 17 is a flow chart for explaining the operation of a second embodiment of the optical storage apparatus according to the present invention.

FIG. 17 is a flow chart for explaining the operation of this second embodiment of the optical storage apparatus. In FIG. 17, a step S21 reads the target position of the phase plate 122 from the correlation table CT which is stored in the memory 18. A step S22 carries out a wobble operation by varying the target position which is read from the memory 18. A step S23 carries out a synchronization adjustment so that the wobble operation is carried out in synchronism with the rotation of the optical disk 72.

Figure 18:
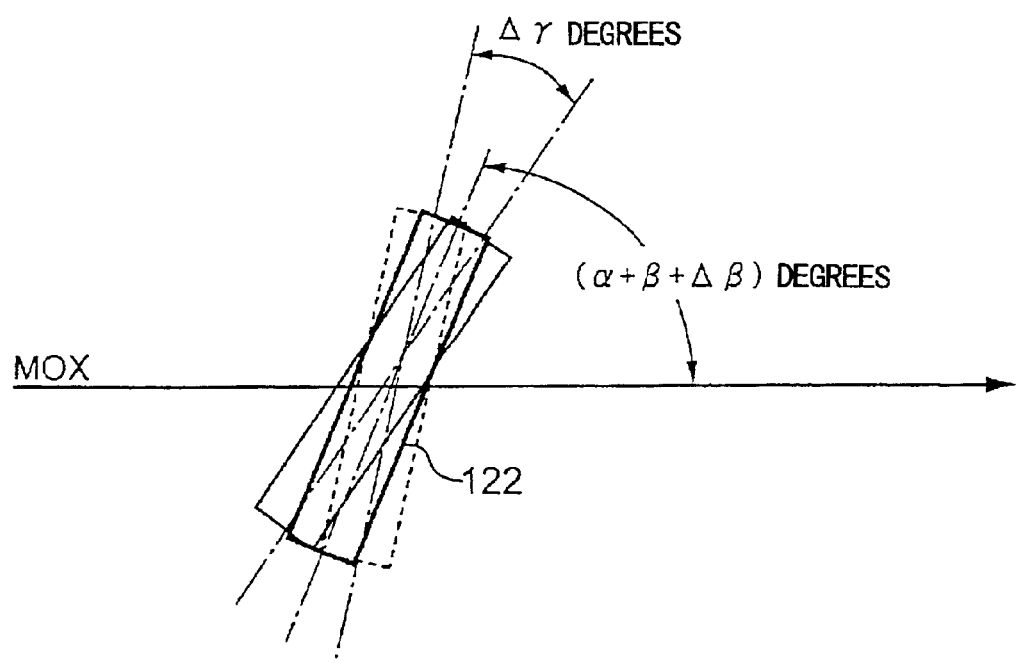
FIG. 18 is a diagram for explaining the inclination angle of the phase plate.
Figure 19:
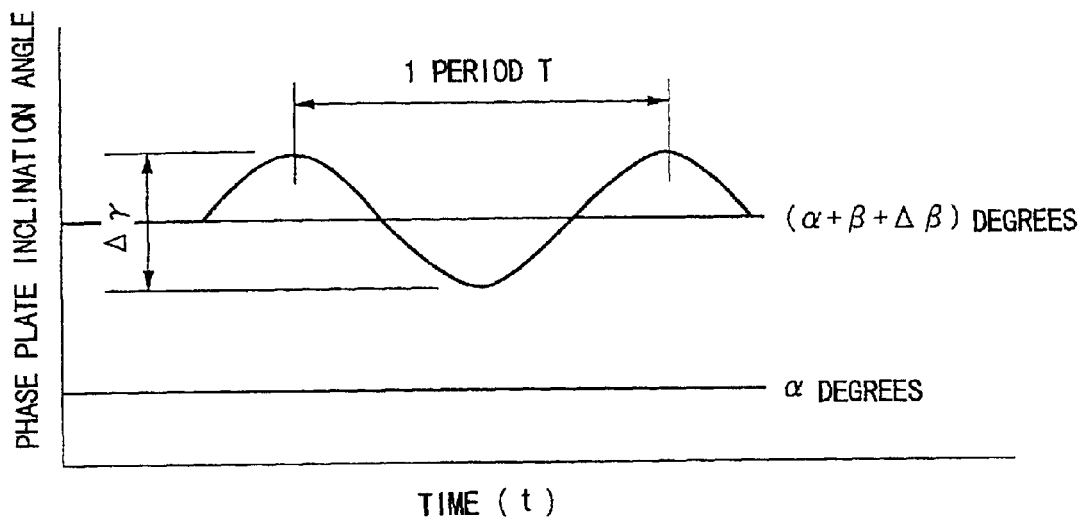
FIG. 19 is a diagram showing a relationship of the inclination angle of the phase plate and time.

FIG. 18 is a diagram for explaining the inclination angle of the phase plate 122 with respect to the optical axis MOX of the returning MO signal. FIG. 19 is a diagram showing a relationship of the inclination angle of the phase plate 122 and time. In FIG. 19 and FIGS. 20 through 22 which will be described later, the ordinate indicates the inclination angle of the phase plate 122 in arbitrary units, and the abscissa indicates the time (t) in arbitrary units. In FIG. 19, the inclination angle of the phase plate 122 which gives an ideal amount of phase compensation (optical phase error) in one revolution period of the optical disk 72 is approximated by a sine curve. In FIGS. 19 through 22, T denotes one revolution period of the optical disk 72, and $\Delta\gamma$ denotes a variable range of the inclination angle of the phase plate 122.

Figure 20:
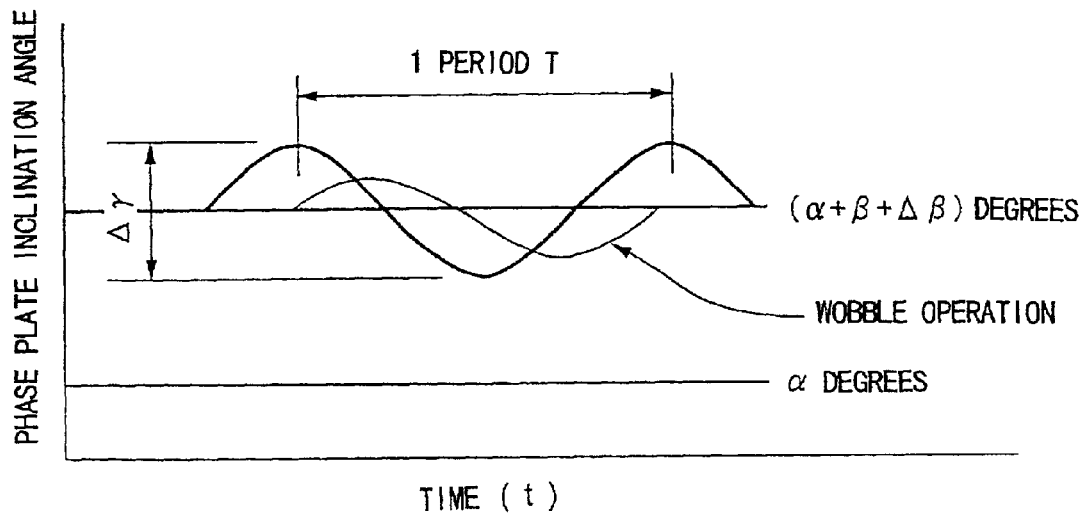
FIG. 20 is a diagram showing a relationship of the inclination angle of the phase plate at a start of a wobble operation and the time.
Figure 21:
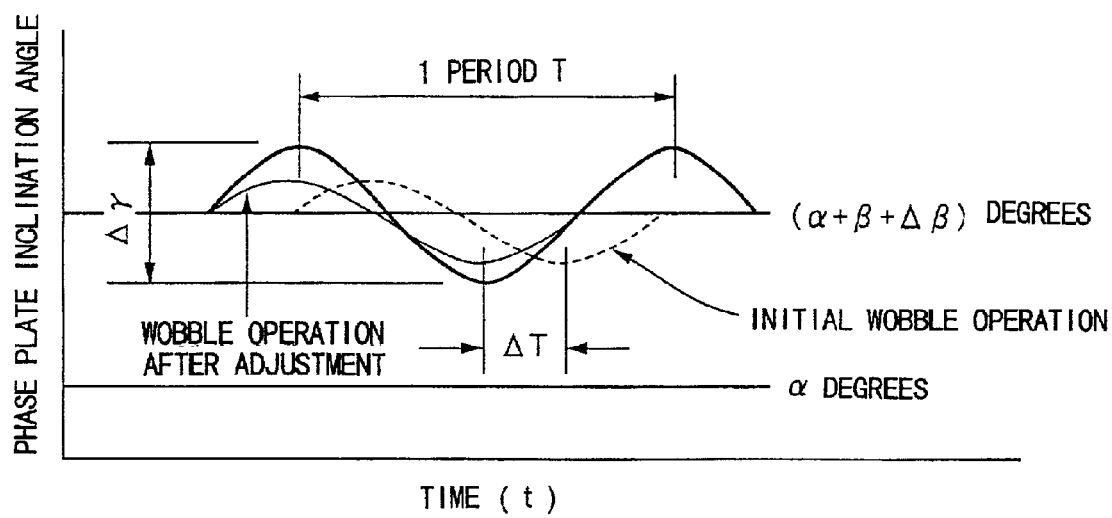
FIG. 21 is a diagram showing a relationship of the inclination angle of the phase plate at a time of synchronization adjustment and the time.

FIG. 20 is a diagram showing a relationship of the inclination angle of the phase plate 122 at a start of the wobble operation in the step S22 and the time, and the inclination angle during the wobble operation is indicated by a thin solid line. In FIG. 20, $\Delta T$ denotes a synchronization error with respect to the rotation period of the optical disk 72 during the initial wobble operation. In addition, FIG. 21 is a diagram showing a relationship of the inclination angle of the phase plate 122 at a time of the synchronization adjustment in the step S23 and the time, and the inclination angle during the initial wobble operation is indicated by a dotted line, and the inclination angle after the synchronization adjustment is indicated by a thin solid line.

Figure 22:
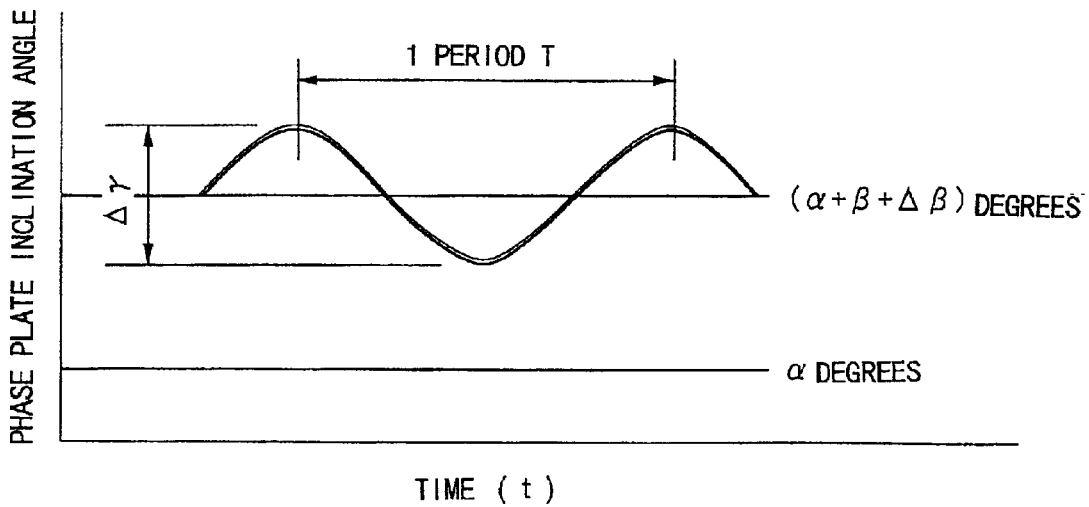
FIG. 22 is a diagram showing a relationship of the inclination angle of the phase plate at a time of amplitude adjustment and the time.

Returning now to the description of the process shown in FIG. 17, a step S24 decides, of the reproduced signal, whether or not the DC fluctuation of the MO signal is a minimum or, whether or not the crosstalk level from the adjacent track is a minimum. The process returns to the step S23 if the decision result in the step S24 is NO. If the decision result in the step S24 is YES, a step S25 stores the synchronization error $\Delta T$ with respect to the rotation period of the optical disk 72 during the wobble operation in the memory 18. A step S26 carries out an amplitude adjustment of the wobble operation, and adjusts the inclination angle of the phase plate 122 to wall within the variable range $\Delta\gamma$. FIG. 22 is a diagram showing a relationship of the inclination angle of the phase plate 122 at a time of amplitude adjustment of the wobble operation and the time, and the inclination angle after the amplitude adjustment is indicated by a thin solid line.

A step S27 decides, of the reproduced signal, whether or not the DC fluctuation of the MO signal is a minimum or, whether or not the crosstalk level from the adjacent tracks is a minimum. The process returns to the step S26 if the decision result in the step S27 is NO. If the decision result in the step S27 is YES, a step S28 stores the inclination angle of the phase plate 122 at the time of the amplitude adjustment of the wobble operation in the memory 18, and the process ends.

Of course, in the steps S24 and S27, it is possible to decide whether or not the DC fluctuation of the MO signal is a minimum and/or whether or not the crosstalk level from the adjacent track is a minimum.

According to this embodiment, it is possible to reproduce the signal by carrying out an appropriate phase compensation within each track, within each zone and/or within a plurality of tracks of the optical recording medium, and the third problem of the prior art described above can be eliminated.

In each of the embodiments described above, the inclination angle of the phase plate 122 is controlled based on the prestored control data. However, a timing at which the control data are obtained is not limited to a particular timing. For example, the control data may be obtained at the time of forwarding the optical disk unit by obtaining the control data with respect to the reference optical disk which is used for generating the control data for controlling the inclination angle of the phase plate 122. The control data may also be obtained with respect to the optical disk 72 when the optical disk 72 is loaded into the optical disk unit.

The control data may be prestored in the memory 18, and correction values for the control data may be obtained by finely adjusting the inclination angle of the phase plate 122 based on the prestored control data at the time of loading the optical disk 72 into the optical disk unit, at a time when a predetermined time has elapsed, at predetermined time intervals, at a time when a temperature change occurs, and the like. In this case, the correction values are also stored in the memory 18. By using the stored correction values, it is possible to appropriately correct the control data to suit the individual optical disk 72 or the environmental change, and the accuracy of the signal reproduction is further improved. The correction values stored in the memory 18 may be cleared when the optical disk 72 is unloaded and ejected from the optical disk unit.

Further, the present invention is not limited to these embodiments, but various variations and modifications may be made without departing from the scope of the present invention.

What is claimed is:

1. A phase compensation method which uses a phase plate to compensate for an optical phase of a reproduced signal in a reproducing optical system which is provided with respect to the reproduced signal from an optical recording medium, comprising the steps of:

recognizing a type of the optical recording medium; and controlling a position of the phase plate to an arbitrary inclination angle within a predetermined variable range depending on whether a track of the medium is a land or a groove, the arbitrary inclination angle differing depending on the type of the optical recording medium, so that a carrier-to-noise ratio of a reproduced signal from a track which is being reproduced becomes a maximum or, a DC fluctuation of the reproduced signal becomes a minimum or, a crosstalk level from tracks adjacent to the track which is being reproduced becomes a minimum.

2. A phase compensation method which uses a phase plate to compensate for an optical phase of a reproduced signal in a reproducing optical system which is provided with respect to the reproduced signal from an optical recording medium, comprising the steps of:

(a) detecting a position of the phase plate where a carrier-to-noise ratio of a reproduced signal from a track which is being reproduced becomes a maximum or, a DC fluctuation of the reproduced signal becomes a minimum or, a crosstalk level from tracks adjacent to the track which is being reproduced becomes a minimum;

(b) storing control data related to the position of the phase plate depending on whether the track is a land or a groove, the position of the phase plate differing depending on a type of the optical recording medium; and (c) controlling the position of the phase plate to an arbitrary inclination angle within a predetermined variable range based on the control data.

3. The phase compensation method as claimed in claim 2, further comprising the step of:

(d) recognizing the type of the optical recording medium.

4. The phase compensation method as claimed in claim 3, further comprising the step of:

(e) obtaining the control data at a time of loading the optical recording medium.

5. The phase compensation method as claimed in claim 2, further comprising the step of:

(d) obtaining the control data at a time of loading the optical recording medium.

6. An optical storage apparatus comprising:

a phase plate configured to compensate for an optical phase of a reproduced signal from an optical recording medium;

a detector configured to detect a position of the phase plate;

a varying unit configured to vary the position of the phase plate; and a control unit configured to control the position of the phase plate to an arbitrary inclination angle within a predetermined variable range depending on whether a track of the medium is a land or a groove, the arbitrary inclination angle differing depending on a type of the optical recording medium, so that a carrier-to-noise ratio of a reproduced signal from a track which is being reproduced becomes a maximum or, a DC fluctuation of the reproduced signal becomes a minimum or, a crosstalk level from tracks adjacent to the track which is being reproduced becomes a minimum.

7. The optical storage apparatus as claimed in claim 6, further comprising:

a memory configured to store control data related to the position of the phase plate where the carrier-to-noise ratio of the reproduced signal from the track which is being reproduced becomes the maximum or, the DC fluctuation of the reproduced signal becomes the minimum or, the crosstalk level from the tracks adjacent to the track which is being reproduced becomes the minimum, said control unit controlling the varying unit based on the control data stored in the memory.

8. The optical storage apparatus as claimed in claim 7, wherein said memory stores control data within one track or, within a plurality of tracks or, within one zone of the optical recording medium.

9. The optical storage apparatus as claimed in claim 6, further comprising:

a recognizing unit configured to recognize the type of the optical recording medium.

10. The optical storage apparatus as claimed in claim 6, further comprising:

means for obtaining control data when loading the optical recording medium into the optical storage apparatus, said control unit controlling the varying unit based on the control data.

11. An optical storage apparatus comprising:

a phase plate configured to compensate for an optical phase of a reproduced signal from an optical recording medium;

a detector configured to detect a position of the phase plate;

a varying unit configured to vary the position of the phase plate; a control unit configured to control the position of the phase plate to an arbitrary inclination angle within a predetermined variable range depending on a type of the optical recording medium, so that a carrier-to-noise ratio of a reproduced signal from a track which is being reproduced becomes a maximum or, a DC fluctuation of the reproduced signal becomes a minimum or, a crosstalk level from tracks adjacent to the track which is being reproduced becomes a minimum; and another phase plate which is fixed within the optical storage apparatus.

12. An optical storage apparatus comprising:

a first phase plate configured to compensate for an optical phase of a reproduced signal from an optical recording medium;

a second phase plate which is fixed within the optical storage apparatus;

a detector configured to detect a position of the first phase plate;

a varying unit configured to vary the position of the first phase plate; and a control unit configured to control the position of the first phase plate within a predetermined variable range depending on a type of the optical recording medium, so that a carrier-to-noise ratio of a reproduced signal from a track which is being reproduced becomes a maximum or, a DC fluctuation of the reproduced signal becomes a minimum or, a crosstalk level from tracks adjacent to the track which is being reproduced becomes a minimum.

* * * * *